(12) United States Patent
Zhang et al.

(10) Patent No.: US 10,848,720 B2
(45) Date of Patent: Nov. 24, 2020

(54) VEHICLE SURVEILLANCE

(71) Applicant: Lumileds LLC, San Jose, CA (US)

(72) Inventors: Xuejun Zhang, Aachen (DE); Xiaobo Zhang, Aachen (DE)

(73) Assignee: Lumileds LLC, San Jose, CA (US)

(*) Notice: Subject to any disclaimer, the term of this patent is extended or adjusted under 35 U.S.C. 154(b) by 0 days.

(21) Appl. No.: 16/464,633

(22) PCT Filed: Nov. 17, 2017

(86) PCT No.: PCT/EP2017/079633
§ 371 (c)(1),
(2) Date: May 28, 2019

(87) PCT Pub. No.: WO2018/099738
PCT Pub. Date: Jun. 7, 2018

(65) Prior Publication Data
US 2019/0379864 A1    Dec. 12, 2019

(30) Foreign Application Priority Data

Dec. 14, 2016   (EP) ..................................... 16203965
Nov. 17, 2017   (WO) ................ PCT/CN2016/107653

(51) Int. Cl.
*G01R 27/26*       (2006.01)
*H04N 7/18*        (2006.01)
(Continued)

(52) U.S. Cl.
CPC ........... *H04N 7/188* (2013.01); *B60R 25/102* (2013.01); *B60R 25/302* (2013.01);
(Continued)

(58) Field of Classification Search
CPC ........ H04N 7/188; H04N 5/77; H04N 5/2628; H04N 7/18; G08B 25/10; B60R 25/32;
(Continued)

(56) References Cited

U.S. PATENT DOCUMENTS 5,334,969 A * 8/1994 Abe ..................... B60R 25/1009
                                                180/123
9,612,123 B1 * 4/2017 Levinson ................. G01S 17/87
(Continued)

FOREIGN PATENT DOCUMENTS

DE   102009017251 A1   10/2010
EP       2733937 A1    5/2014
JP       2001061129 A   3/2001

OTHER PUBLICATIONS

EPO as ISA, PCT/EP2017/079633 filed Nov. 17, 2017, "international Search Report and Written Opinion", dated Feb. 23, 2018, 16 pages.
(Continued)

*Primary Examiner* — Howard D Brown, Jr.

(57) ABSTRACT

A vehicle monitoring apparatus is described, comprising: a vehicle state detector detecting whether the vehicle is in a parking state; a motion detection sensor detecting whether an object is moving relative to the vehicle; an image recorder recording image data relating to the surrounding environment of the vehicle; a touch sensor sensing whether the object is touching the vehicle; a main control unit configured to: start the motion detection sensor when the vehicle state detector detects that the vehicle is in a parking state, turn on the image recorder and the touch sensor when the motion detection sensor detects that an object is moving with respect to the vehicle, and trim the image data recorded during a predetermined time period when the touch sensor senses that the object is touching the vehicle, the predetermined time period comprising the duration of the object being in touch with the vehicle; and a storage storing the trimmed image data. With this, the capacity of the storage can be utilized effectively.

15 Claims, 3 Drawing Sheets

(51) Int. Cl.
*B60R 25/102* (2013.01)
*B60R 25/30* (2013.01)
*B60R 25/32* (2013.01)
*G08B 25/10* (2006.01)
*H04N 5/262* (2006.01)
*H04N 5/77* (2006.01)

(52) U.S. Cl.
CPC ............ *B60R 25/305* (2013.01); *B60R 25/32* (2013.01); *G08B 25/10* (2013.01); *H04N 5/2628* (2013.01); *H04N 5/77* (2013.01)

(58) Field of Classification Search
CPC ... B60R 25/305; B60R 25/302; B60R 25/102; B60R 25/31
See application file for complete search history.

(56) References Cited

U.S. PATENT DOCUMENTS

| | | | |
|---|---|---|---|
| 2007/0236497 A1* | 10/2007 | Kondo | G08B 13/1966 345/440 |
| 2009/0066346 A1* | 3/2009 | Kaltner | E05F 15/46 324/681 |
| 2012/0158239 A1* | 6/2012 | Brunou | B60T 8/1755 701/29.1 |
| 2015/0029041 A1 | 1/2015 | Liu et al. | |
| 2015/0169968 A1 | 6/2015 | Michmerhuizen et al. | |

OTHER PUBLICATIONS

Extended European Search Report, EP Application No. 16203965.5, 10 pages.

* cited by examiner

VEHICLE SURVEILLANCE

CROSS-REFERENCE TO RELATED APPLICATIONS

The present application is a § 371 application of International Application No. PCT/EP2017/079633 filed on Nov. 17, 2017 and titled "VEHICLE SURVEILLANCE", which claims the benefit of International Patent Application No. PCT/CN2016/107653 filed on Nov. 29, 2016 and European Patent Application No. 16203965.5 filed on Dec. 14, 2016. International Application No. PCT/EP2017/079633, International Patent Application No. PCT/CN2016/107653, and European Patent Application No. 16203965.5 are incorporated herein.

FIELD

This disclosure relates to a field of vehicle surveillance, and specifically to a vehicle monitoring apparatus and a method of monitoring a vehicle.

BACKGROUND

Various types of traffic accidents often occur in daily life. When a traffic accident occurs, it is very helpful to have data relating to the traffic accident such as image or video data of the incident. The data can then be analyzed and possibly used as evidence. A driver also would like to have the data regarding accidents at parking situations. Many known vehicle monitoring devices continuously monitor the surroundings of the vehicle, which however will produce a lot of useless data in their storage cards. Thus, the capacity of the storage cards is seriously wasted.

US20070236497A1 and US20150169968A1 alleviate the storage, but also the energy consumption, issues somewhat by monitoring the vehicle's neighborhood with one or more sensors and starting the video recording only when an object is detected or even only when an object approaches the vehicle. DE102009017251A1 uses a capacitive sensor for detecting an object approaching or touching the vehicle to start e.g. a video recording.

SUMMARY

According to an aspect of this disclosure, there is provided a vehicle monitoring apparatus, comprising: a vehicle state detector configured to detect whether the vehicle is in a parking state; a motion detection sensor configured to detect whether an object is moving relative to the vehicle; an image recorder configured to record image data relating to the surrounding environment of the vehicle; a touch sensor configured to sense whether the object is touching the vehicle; a main control unit configured to: start the motion detection sensor when the vehicle state detector detects that the vehicle is in a parking state, turn on the image recorder and the touch sensor when the motion detection sensor detects that an object is moving with respect to the vehicle, and trim the image data recorded by the image recorder during a predetermined time period when the touch sensor senses that the object is touching the vehicle, the predetermined time period comprising the duration of the object being in touch with the vehicle; and a storage configured to store the trimmed image data.

This is advantageous in that only when the touch sensor senses a touching event, the video clips relevant to the touching event will be written in the storage so that useless data in the storage card can be reduced greatly. Thus, the capacity of the storage can be utilized effectively.

In an embodiment, the touch sensor can comprise a capacitive proximity sensor. A capacitive proximity sensor generally has a good performance in sensing a touch. Optionally, the capacitive proximity sensor can comprise a first capacitor, wherein the first capacitive plate of the first capacitor is the chassis of the vehicle, and the second capacitive plate of the first capacitor is the earth ground or is capacitively coupled to the earth ground.

In an embodiment, the object can be a human or another vehicle, and form a second capacitor with the chassis of the vehicle, wherein the first capacitive plate of the second capacitor is the chassis of the vehicle, and the second capacitive plate of the second capacitor is the body of the human or the chassis of said another vehicle. As an example, the capacitive proximity sensor can be configured to sense whether the object is touching the vehicle by detecting a change in capacitance of the second capacitor. Since the chassis of the vehicle is connected with the whole body of the vehicle, the capacitive proximity sensor can act as an omnidirectional sensor which can detect the object touching at every point of the vehicle.

In an embodiment, the vehicle monitoring apparatus can further comprise an environmental sensor configured to sense interference to the capacitive proximity sensor. The environmental sensor can be positioned at a specific location (such as the front window or the roof) of the vehicle so that the environmental sensor only tracks the environmental factors which may have serious interference to the capacitive proximity sensor.

In an embodiment, the vehicle monitoring apparatus can be fixed to the vehicle through a bracket, and the environmental sensor can be integrated with the bracket. This provides a simple mounting solution of the environmental sensor.

In an embodiment, the capacitive proximity sensor can be configured to detect the change in capacitance of the second capacitor by monitoring the potential of a pin of an OBD interface of the vehicle.

In an embodiment, the vehicle monitoring apparatus can further comprise a wireless communication module configured to transmit a warning message to a receiver of an owner of the vehicle when the touch sensor senses that the object is touching the vehicle. Additionally or alternatively, the main control unit is configured to notify the controller of the vehicle to issue an alarm signal when the touch sensor senses that the object is touching the vehicle.

In an embodiment, the vehicle state detector can detect that the vehicle is in a parking state when the distance from an owner of the vehicle to the vehicle is larger than a predetermined distance threshold. Additionally, the vehicle state detector can detect that the vehicle is in a non-parking state when the distance from the owner of the vehicle to the vehicle is less than or equal to the predetermined distance threshold.

In an embodiment, the main control unit can be further configured to turn off the image recorder and the touch sensor when the motion detection sensor does not detect any object is moving relative to the vehicle for a defined time period.

In an embodiment, the main control unit can be configured to turn off the motion detection sensor and the touch sensor and turn on the image recorder when the vehicle state detector detects that the vehicle is in a non-parking state. This is typically the case in a normal driving environment.

According to another aspect of this disclosure, there is provided a method of monitoring a vehicle, comprising: detecting whether the vehicle is in a parking state; detecting whether an object is moving relative to the vehicle in response to detecting that the vehicle is in a parking state; recording image data relating to the surrounding environment of the vehicle in response to detecting the object is moving relative to the vehicle; sensing whether the object is touching the vehicle; and trimming and storing the image data recorded during a predetermined time period in response to sensing that the object is touching the vehicle, the predetermined time period comprising the duration of the object being in touch with the vehicle.

According to yet another aspect of this disclosure, there is provided a computer-readable storage media storing computer-useable instructions that, when used by one or more computing devices, cause the one or more computing devices to perform the above method of monitoring a vehicle.

These and other advantages of the disclosure will be apparent from and elucidated with reference to the embodiments described hereinafter.

BRIEF DESCRIPTION OF THE DRAWINGS

The disclosure will now be described in more detail and with reference to the appended drawings in which.

DETAILED DESCRIPTION

The following description provides specific details for a thorough understanding of, and enabling description for, various embodiments of the disclosure. One skilled in the art will understand that the technical solution of the disclosure may be practiced without many of these details. In some instances, well-known structures and functions have not been shown or described in detail to avoid unnecessarily obscuring the description of embodiments of the disclosure. It is intended that the terminology used in this disclosure be interpreted in its broadest reasonable manner, even though it is being used in conjunction with a detailed description of certain embodiments of the disclosure.

Figure 1:
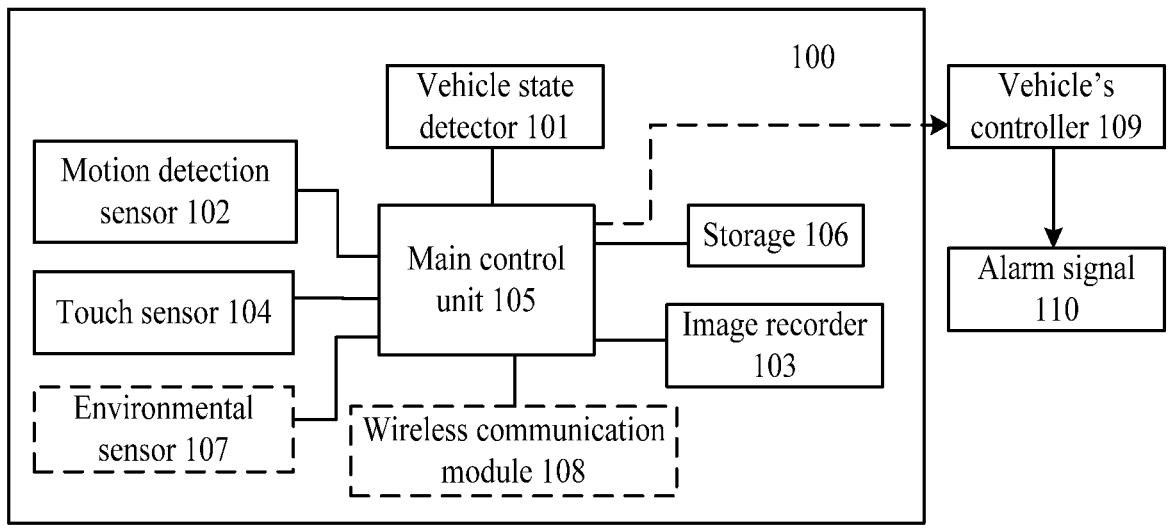
FIG. 1 is an example structure drawing of a vehicle monitoring apparatus according to an embodiment of the disclosure.

FIG. 1 is an example structure drawing of a vehicle monitoring apparatus 100 according to an embodiment of the disclosure. As shown, the vehicle monitoring apparatus 100 comprises a main control unit 105, and a vehicle state detector 101, a motion detection sensor 102, an image recorder 103, a touch sensor 104, and storage 106 which are communicatively coupled with each other, for example by means of the main unit. In an embodiment, the vehicle monitoring apparatus 100 can further comprise an environmental sensor 107 and/or a wireless communication module 108, as shown in FIG. 1.

The vehicle state detector 101 can be configured to detect whether the vehicle is in a parking state. It should be understood that the term "a parking state" as used herein refers to a state in which the engine of the vehicle is completely stopped. In other words, the parking state usually means that the driver has parked and left the vehicle. In view of this, the vehicle state detector can detect whether the vehicle is in a parking state by detecting the power supplied from the auxiliary power source (ACC source) of the vehicle. For example, the vehicle can be detected to be in a parking state if there is no power supplied from the ACC source. It should be noted that other ways of detecting whether the vehicle is in a parking state are also contemplated, such as detecting the air pressure in the vehicle's tires.

The motion detection sensor 102 can be configured to detect whether an object is moving relative to the vehicle. The motion detection sensor can, for example, be a microwave sensor which detects whether or not the object is moving by emitting microwave radiation at a certain frequency and sensing the echo thereof. It should be noted that other motion detection sensors are also contemplated, such as a passive infrared sensor, an ultrasonic sensor and so on.

The image recorder 103 can be configured to record image data relating to the surrounding environment of the vehicle. The image recorder can, for example, be a module including a set of a lens and an optical sensor. Such a module can focus an image onto the optical sensor be means of the lens, and the image then can be converted into electrical signals by the optical sensor. Such a module is already widely used in various devices such as mobile phones, monitors, and the like. Typically, the image recorder can be a video recorder, and the image data can be a video recorded by the video recorder.

The touch sensor 104 can be configured to sense whether the object is touching the vehicle. The touch sensor can, for example, be any kind of a proximity sensor, such as a capacitive touch sensor, a resistive touch sensor, an acoustic touch sensor, an inductive sensor, a laser rangefinder, a Hall-effect sensor, an eddy-current sensor, a magnetic sensor and so on. In an embodiment, the touch sensor can be a capacitive proximity sensor. The capacitive proximity sensor can comprise a first capacitor, wherein the first capacitive plate of the first capacitor can be the chassis of the vehicle, and the second capacitive plate of the first capacitor can be the earth ground or can be capacitively coupled to the earth ground. Indeed, the whole body of the vehicle can be considered as the first capacitive plate of the first capacitor, because the chassis of the vehicle is always connected with the whole body. The object is typically a human or another vehicle, and will form a second capacitor with the chassis of the vehicle when it approaches the vehicle. For example, the first capacitive plate of the second capacitor can be the chassis of the vehicle, and the second capacitive plate of the second capacitor can be the body of the human or the chassis of said another vehicle. With the approaching of the object to the chassis of the vehicle, the capacitance of the second capacitor will change. In this case, the capacitive proximity sensor can be configured to sense whether the object is touching the vehicle by a change in capacitance of the second capacitor.

The main control unit 105 can be configured to: start the motion detection sensor to detect whether the object is moving relative to the vehicle when the vehicle state detector detects that the vehicle is in a parking state, turn on the image recorder to record image data relating to the surrounding environment of the vehicle and turn on the touch sensor to sense whether the object is touching the vehicle when the motion detection sensor detects that an object is moving with respect to the vehicle, and trim the image data recorded during a predetermined time period when the touch sensor senses that the object is touching the vehicle, wherein the predetermined time period should comprise the duration of the object being in touch with the vehicle so as to record the entire touch event without losing any important evidence.

The main control unit 105 can be implemented as a hardware unit and/or a software module. For example, the hardware unit can include a processor, microprocessor, an integrated circuit or an on-chip system, an application specific integrated circuit (ASIC), a field programmable gate array (FPGA), a complex programmable logic device (CPLD), and the like.

The storage (106) can be configured to store the trimmed image data. The storage can be a removable storage or a non-removable storage. For example, the storage can be ROM, electrically erasable read-only memory (EEPROM), flash memory cards, CD-ROM, digital versatile disks (DVD) or other optical storage, magnetic cassettes, magnetic tape, magnetic disk storage or other storage devices which can be used to store information.

A single capacitive proximity sensor might fail when environmental factors such as rain, ice or snow exist near the body of the vehicle, because such environmental factors will interfere with the capacitive proximity sensor. In order to eliminate the interference of the environmental factors to the capacitive proximity sensor, in an embodiment, the vehicle monitoring apparatus can further comprise an environmental sensor 107 which is configured to sense the interference to the capacitive proximity sensor. The environmental sensor can be positioned at a specific location (such as the front window or the roof) of the vehicle so that the environmental sensor only tracks the environmental factors relevant for the working of the capacitive proximity sensor. For example, when an environmental sensor and a proximity sensor sense an object at the same time, the object may be an interfering factor to the capacitive proximity sensor, rather than an object desired to be detected. In an embodiment, the environmental sensor can be another capacitive proximity sensor. In an embodiment, the vehicle monitoring apparatus can be fixed to the vehicle through a bracket, and the environmental sensor can be integrated with the bracket. In this way, the effort for mounting the environmental sensor could be greatly reduced.

In an embodiment, the vehicle monitoring apparatus can further comprise a wireless communication module 108 configured to transmit a warning message to a receiver of an owner of the vehicle when the touch sensor senses that the object is touching the vehicle. The wireless communication module can include but is not limited to a mobile communication module (such as 2G, 3G, 4G, 5G modules, etc.), a Zigbee module, a Bluetooth module, a Wi-Fi module, etc. The warning message can be text, symbol, icon, image, and/or video clip. And, the warning message can indicate that the vehicle is being touched by an object.

In an embodiment, the main control unit can further be configured to notify a controller 109 of the vehicle to issue an alarm signal 110 when the touch sensor senses that the object is touching the vehicle. The alarm signal will cause the vehicle's headlights to flash and/or the vehicle' horn to beep. Additionally or alternatively, the alarm signal can also be sent out by an alarm component integrated with the vehicle monitoring apparatus.

In an embodiment, the vehicle state detector can detect that the vehicle is in a parking state when the distance from the owner of the vehicle to the vehicle is larger than a predetermined distance threshold. Additionally or alternatively, the vehicle state detector can detect that the vehicle is in a non-parking status when the distance from an owner of the vehicle to the vehicle is less than or equal to the predetermined distance threshold. The distance from the owner of the vehicle to the vehicle can be determined based on the location information of the owner and the vehicle. The location information of the owner can be obtained from a GPS device or a cell phone carried by the owner. The location information of the vehicle can also be obtained in the same way. In the case that each of the owner and the vehicle carries a Wi-Fi/Bluetooth module, the predetermined distance threshold can be set to a distance between the two Wi-Fi/Bluetooth modules when the connected state and the disconnected state thereof are automatically switched due to a unique SSID (Service Set Identifier) possessed by them.

In an embodiment, the main control unit can be further configured to turn off the image recorder and the touch sensor when the motion detection sensor does not detect any object moving relative to the vehicle for a defined time period. In another embodiment, the main control unit can be further configured to turn off the motion detection sensor and the touch sensor, and turn on the image recorder when the vehicle state detector detects that the vehicle is in a non-parking state.

The vehicle monitoring apparatus could also comprise other components. It should be noted that the vehicle monitoring apparatus may comprise a single entity consisting of the above components, or multiple entities separated from one another in space. For example, the storage can be separated from or integrated within the image recorder.

Figure 2:
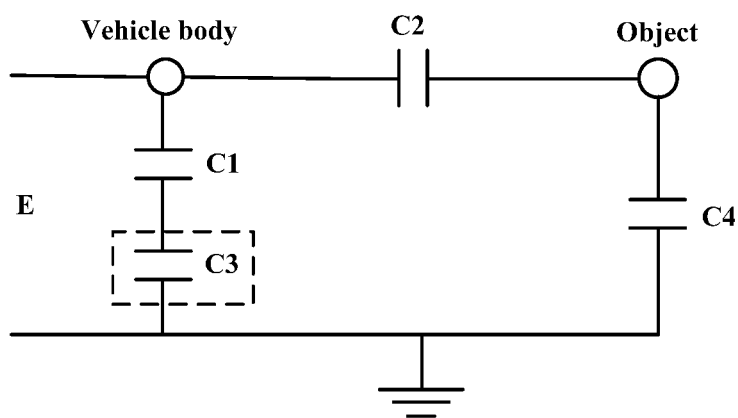
FIG. 2 is an example schematic diagram of a capacitive proximity sensor used according to an embodiment of the disclosure.

FIG. 2 is an example schematic diagram of a capacitive proximity sensor 200 described above. As shown, the capacitive proximity sensor comprises a first capacitor C1, wherein the first capacitive plate of the first capacitor can be the chassis of the vehicle, and the second capacitive plate of the first capacitor can be the earth ground or can be capacitively coupled to the earth ground (for example, be means of a capacitor C3). Indeed, the whole body of the vehicle can be considered as the first capacitive plate of the first capacitor, because the chassis of the vehicle is always connected with the whole body. The object is typically a human or another vehicle, and will form a second capacitor C2 with the chassis of the vehicle when the object approaches the vehicle. Moreover, the object always has a capacitance C4 to the earth ground. As shown in the FIG. 2, an electric field E can be applied between the first capacitive plate of the first capacitor and the earth ground. With the approaching of the object to the chassis or the vehicle body, the capacitance of the second capacitor will change. Thus, the capacitive proximity sensor can be configured to sense whether the object is touching the vehicle by detecting a change in capacitance of the second capacitor.

Figure 3:
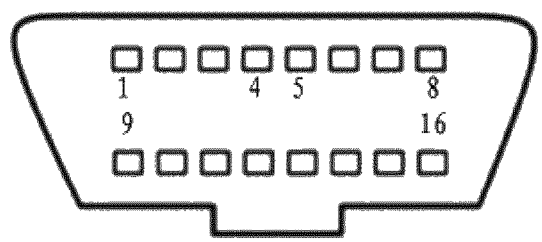
FIG. 3 is a schematic diagram of an OBD (On-Board Diagnostics) interface used according to an embodiment of the disclosure.

In an embodiment, the capacitive proximity sensor can be configured to detect the change in capacitance of the second capacitor by monitoring the potential of a pin of an OBD interface of the vehicle. Most cars in the market are now equipped with such an interface where the fourth pin of the OBD allows deriving the desired capacitance information. FIG. 3 illustrates a schematic diagram of such an OBD interface 300. As shown, pins 1-8 are arranged from left to right in the upper row of the interface 300, and pins 9-16 are arranged from left to right in the lower row of the interface. Pin 4 provides the chassis ground, thus the change in capacitance of the second capacitor can be easily detected by monitoring the potential of the fourth pin of the OBD interface of the vehicle.

Figure 4:
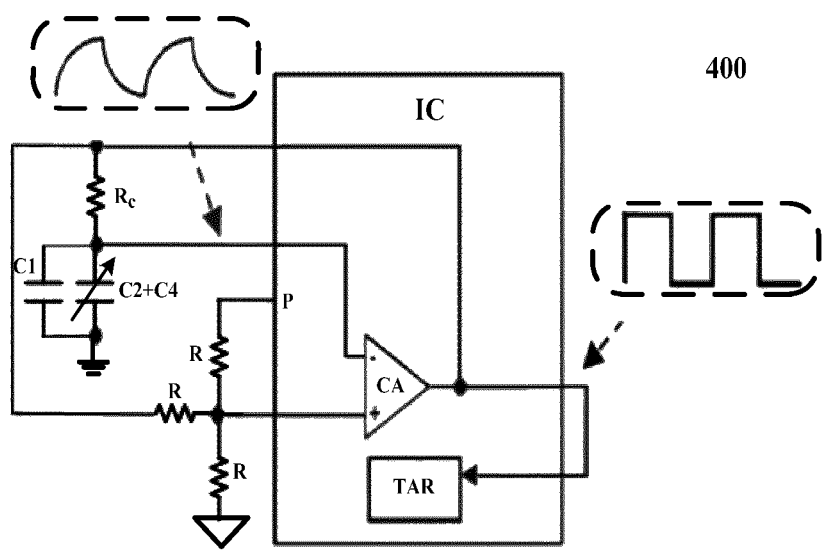
FIG. 4 is an example detection circuit that can be used with the capacitive proximity sensor according to an embodiment of the disclosure.

FIG. 4 is an example detection circuit 400 that can be used with the capacitive proximity sensor according to an embodiment of the disclosure. As shown, this detection circuit is designed as a RC oscillation circuit, and uses a comparator CA within an integrated circuit IC to achieve the detection of the touch. The IC can, for example, be a microcontroller with the comparator, such as MSP430 designed by Texas Instruments. The positive input of the comparator is connected to a resistor network, and the negative input of the comparator is connected between a resistor Rc and the first capacitor C1. The resistor network connected to the comparator provides a reference voltage for the comparator.

In FIG. 4, the voltage output from the P port is a high potential, and thus the positive input of the comparator is at a high potential. Then, the capacitor C1 can be charged until the potential at the negative input of the comparator becomes high. At this time, the potential at the output of the comparator is reversed and the capacitor C1 starts to discharge. Then the RC oscillation circuit continues to oscillate in this manner. The output of the comparator is a square wave signal which can be counted by a counter TAR. Thus, the number of oscillations in a fixed time window can be monitored to determine whether the object is touching the vehicle.

Figure 5:
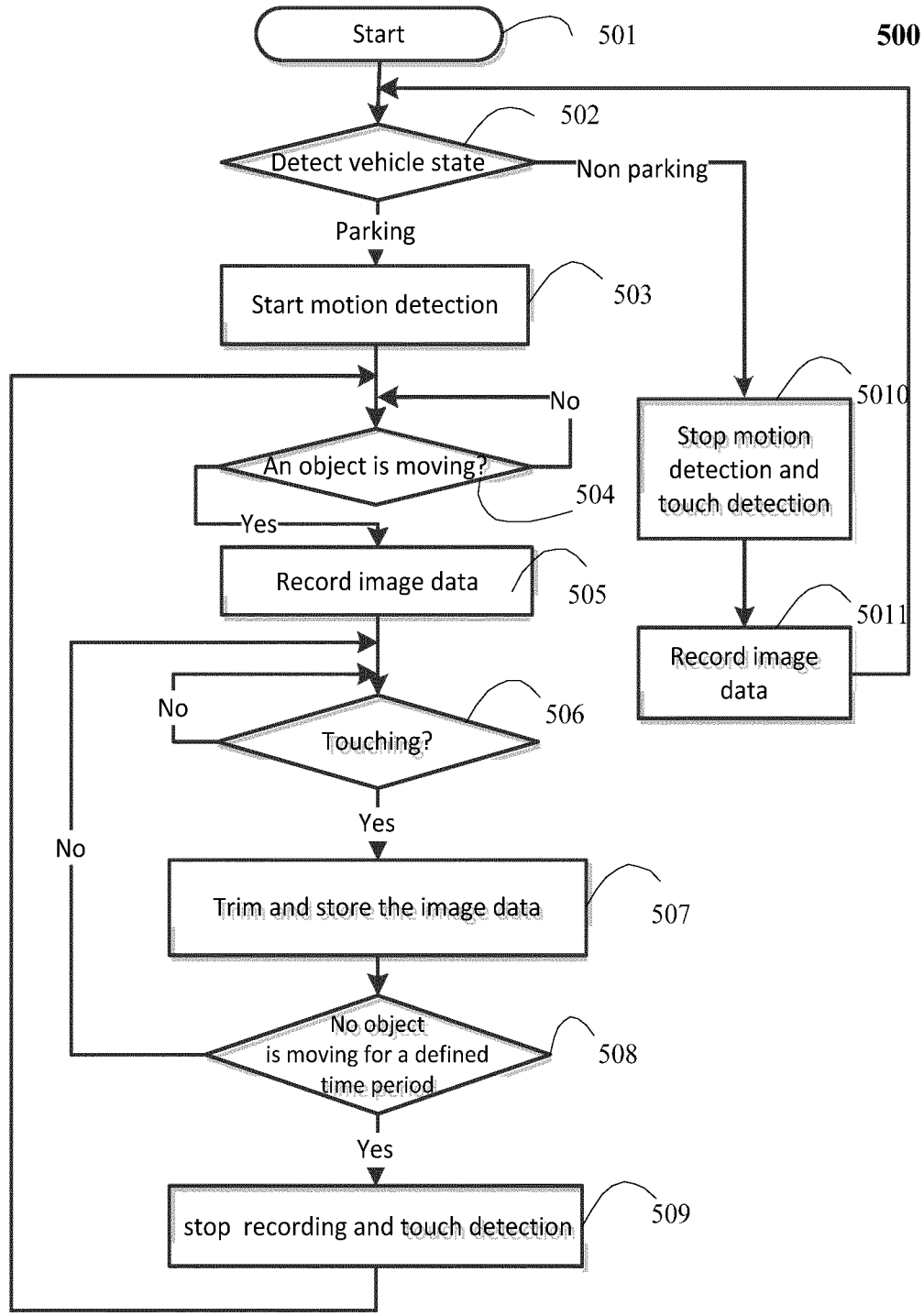
FIG. 5 is a flow chart of a method of monitoring a vehicle according to an embodiment of the disclosure.

FIG. 5 is a flow chart of a method 500 of monitoring a vehicle according to an embodiment of the disclosure. The method 500 is described below with reference to the vehicle monitoring apparatus 100 of FIG. 1. However, in other embodiments, the method 500 may be implemented in other suitable or other suitable types of one or more computing devices capable of performing at least some of the operations of method 500. The method 500 may also be implemented as computer-useable instructions stored on a computer-readable storage media. The computer-useable instructions will cause one or more computing devices to perform the method when used by the one or more computing devices.

As shown, the method starts at step 501. Then, at step 502, whether the vehicle is in a parking state can be detected. The step 502 can be implemented by the vehicle state detector 101 described in FIG. 1, for example.

If the vehicle is in a parking state, the motion detection can be started at step 503, for example by starting the motion detection sensor 102. And, at step 504, whether an object is moving relative to the vehicle can be detected. In response to detecting the object is moving relative to the vehicle, image data relating to the surrounding environment of the vehicle can be recorded at step 505, for example by means of an image recorder 103. Then, whether the object is touching the vehicle can be sensed at step 506. Step 506 can be performed by the touch sensor 104 described in FIG. 1, especially by a capacitive proximity sensor.

In response to sensing that the object is touching the vehicle, the image data recorded during a predetermined time period are trimmed and stored at step 507, the predetermined time period comprising the duration of the object being in touch with the vehicle. In that, the predetermined time period is defined as the sum of time periods t1, t2 and t3, wherein t1 represents a time period before the touch, t2 represents the duration of the object being in touch with the vehicle, and t3 represents a time period after the end of the touch. Whether there still exists a movement can be detected at step 508. If no object is detected to be moving relative to the vehicle for a defined time period, the image recording and the touch sensing can be stopped at step 509.

If the vehicle is detected to be in a non-parking state at step 502, the motion detection about whether an object is moving relative to the vehicle and the touch detection about whether the object is touching the vehicle can be stopped at step 5010, and the image recording can be turned on at step 5011. This is typically the case in a normal driving environment.

It is to be understood that the embodiments of the present disclosure for clarity have been described with reference to different functional units. However, it will be apparent that the functionality of each functional unit may be implemented in a single unit, in a plurality of units, or as a part of other functional units without detracting from the present disclosure. Hence, references to specific functional units are only to be seen as references to suitable units for providing the described functionality rather than indicative of a strict logical or physical structure or organization. As such, the present disclosure may be implemented in a single unit, or may be physically and functionally distributed between different units and circuits.

Although the present disclosure has been described in connection with some embodiments, it is not intended to be limited to the specific form set forth herein. Rather, the scope of the present disclosure is limited only by the accompanying claims. Additionally, although individual features may be included in different claims, these may possibly be advantageously combined, and the inclusion in different claims does not imply that a combination of features is not feasible and/or advantageous. The order of features in the claims does not imply any specific order in which the features must be worked. In addition, in the claims, the word "comprise" or "include" does not exclude other elements, and the indefinite article "a" or "an" does not exclude a plurality. Reference signs in the claims are provided merely as a clarifying example and shall not be construed as limiting the scope of the claims in any way.

The invention claimed is:

1. A vehicle monitoring apparatus, comprising:
   a vehicle state detector configured to detect whether the vehicle is in a parking state;
   a motion detection sensor configured to detect whether an object is moving relative to the vehicle;
   an image recorder configured to record image data relating to the surrounding environment of the vehicle;
   a touch sensor configured to sense whether the object is touching the vehicle;
   a main control unit configured to:
      start the motion detection sensor when the vehicle state detector detects that the vehicle is in a parking state,
      turn on the image recorder and the touch sensor when the motion detection sensor detects that an object is moving with respect to the vehicle, and
      trim the image data recorded by the image recorder during a predetermined time period when the touch sensor senses that the object is touching the vehicle, the predetermined time period comprising a time period t1 before the touch, a time period t2 representing the duration of the object being in touch with the vehicle, and a time period t3 after the end of the touch;
   a storage configured to store the trimmed image data.

2. The vehicle monitoring apparatus of claim 1, wherein the touch sensor comprises a capacitive proximity sensor.

3. The vehicle monitoring apparatus of claim 2, wherein the capacitive proximity sensor comprises a first capacitor (C1), and wherein the first capacitive plate of the first capacitor (C1) is the chassis of the vehicle, and the second capacitive plate of the first capacitor (C1) is the earth ground or is capacitively coupled to the earth ground.

4. The vehicle monitoring apparatus of claim 3, wherein the object is a human or another vehicle and forms a second capacitor (C2) with the chassis of the vehicle, wherein the first capacitive plate of the second capacitor (C2) is the chassis of the vehicle, and the second capacitive plate of the second capacitor (C2) is the body of the human or the chassis of said another vehicle.

5. The vehicle monitoring apparatus of claim 4, wherein the capacitive proximity sensor is configured to sense whether the object is touching the vehicle by detecting a change in capacitance of the second capacitor (C2).

6. The vehicle monitoring apparatus of claim 2, further comprising an environmental sensor for sensing environmental factors that may interfere to the capacitive proximity sensor, such as rain, ice or snow existing near a body of the vehicle.

7. The vehicle monitoring apparatus of claim 6, wherein the vehicle monitoring apparatus is fixed to the vehicle through a bracket, and the environmental sensor is integrated with the bracket.

8. The vehicle monitoring apparatus of claim 5, wherein the capacitive proximity sensor is configured to detect the change in capacitance of the second capacitor (C2) by monitoring the potential of a pin of an OBD interface of the vehicle.

9. The vehicle monitoring apparatus of claim 1, further comprising a wireless communication module configured to transmit a warning message to a receiver of an owner of the vehicle when the touch sensor senses that the object is touching the vehicle.

10. The vehicle monitoring apparatus of claim 1, wherein the main control unit is configured to notify a controller of the vehicle to issue an alarm signal when the touch sensor senses that the object is touching the vehicle.

11. The vehicle monitoring apparatus of claim 1, wherein the vehicle state detector detects that the vehicle is in a parking state when the distance from an owner of the vehicle to the vehicle is larger than a predetermined distance threshold.

12. The vehicle monitoring apparatus of claim 1, wherein the main control unit is further configured to turn off the image recorder and the touch sensor when the motion detection sensor does not detect any object moving relative to the vehicle for a defined time period.

13. The vehicle monitoring apparatus of claim 1, wherein the main control unit is configured to turn off the motion detection sensor and the touch sensor and turn on the image recorder when the vehicle state detector detects that the vehicle is in a non-parking state.

14. A method of monitoring a vehicle, comprising:
    detecting whether the vehicle is in a parking state;
    detecting whether an object is moving relative to the vehicle in response to detecting that the vehicle is in a parking state;
    recording image data relating to the surrounding environment of the vehicle in response to detecting the object is moving relative to the vehicle;
    sensing whether the object is touching the vehicle; and
    trimming and storing the image data recorded during a predetermined time period in response to sensing that the object is touching the vehicle, the predetermined time period comprising a time period t1 before the touch, a time period t2 representing the duration of the object being in touch with the vehicle, and a time period t3 after the end of the touch.

15. A non-transitory computer-readable storage media storing computer-useable instructions that, when used by one or more computing devices, cause the one or more computing devices to perform the method of claim 14.

* * * * *